(No Model.)
R. F. HULL.
MACHINE FOR CLEANING AND REPAIRING ROLLER SKATES.
No. 323,689. Patented Aug. 4, 1885.
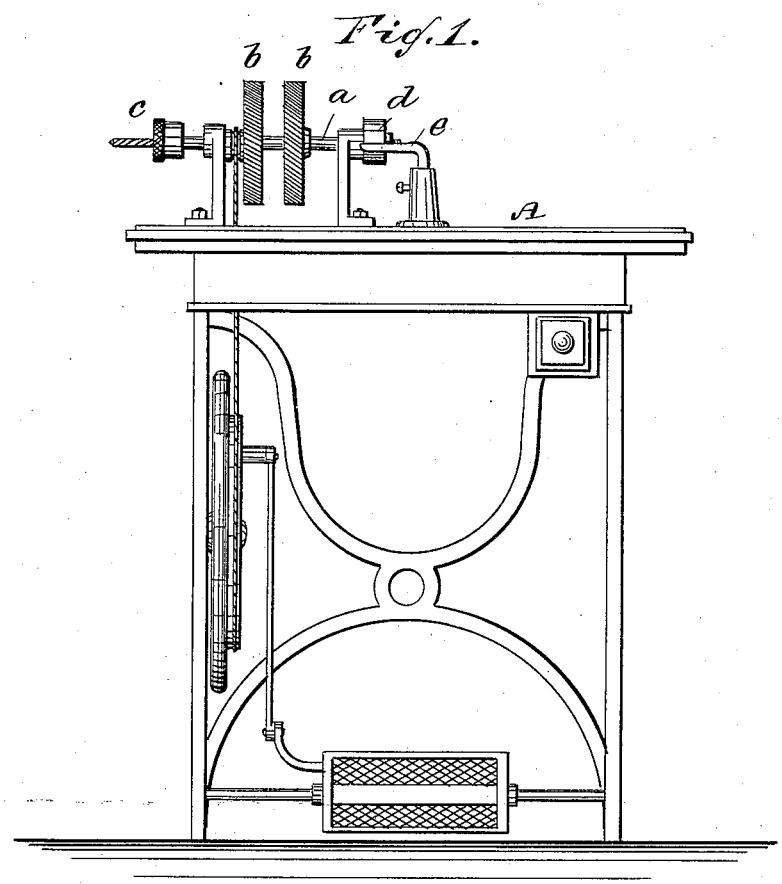
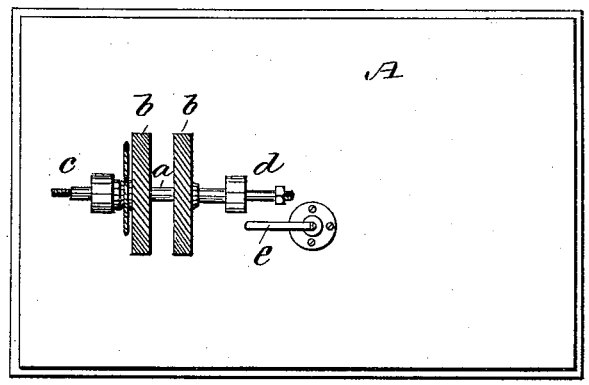
WITNESSES:
Theo. G. Hoster
C. Sedgwick
INVENTOR:
R. F. Hull
BY Munn & Co
ATTORNEYS.

UNITED STATES PATENT OFFICE.

RUFUS F. HULL, OF FONDA, IOWA.

MACHINE FOR CLEANING AND REPAIRING ROLLER-SKATES.

SPECIFICATION forming part of Letters Patent No. 323,689, dated August 4, 1885.

Application filed December 26, 1884. (No model.)

*To all whom it may concern:*

Be it known that I, RUFUS F. HULL, of Fonda, in the county of Pocahontas and State of Iowa, have invented a new and Improved Machine for Cleaning and Repairing Roller-Skates, of which the following is a full, clear, and exact description.

My improved machine is intended especially for use at roller-skate rinks, where large numbers of skates are constantly required to be cleaned or repaired; and the invention consists in a novel combination of mechanism, whereby the skate-rollers can be cleaned, leveled, and rebored, and the brackets of the skates also rebored, as hereinafter described and claimed.

Reference is to be had to the accompanying drawings, forming a part of this specification, in which similar letters of reference indicate corresponding parts in both the figures.

Figure 1 is a front elevation of the machine. Fig. 2 is a plan view of the same.

On a suitable table or bed, A, a shaft, $a$, is supported in suitable bearings, and provided with a pulley that is connected by a belt with a balance-wheel that is arranged for being rotated by a treadle.

Upon the shaft $a$ are two disks or wheels, $b$ $b$, that have a series of spiral or inclined grooves cut in their peripheries, and these wheels are fixed upon the shaft a suitable distance apart. These wheels $b$ $b$ are spaced to correspond with the space between the skate-wheels to be operated on, so that each one of the skate-wheels will be operated upon by a separate wheel.

Upon one end of the shaft $a$ is a chuck, $c$, for holding drills or reamers, and upon the other end a chuck, $d$, adapted for receiving a skate-roller or an emery-wheel.

A socket with an adjustable rest, $e$, is fastened to the table in a suitable position for supporting the tools used in turning the rollers, and is used also as a rest for the tools when ground on the emery-wheel.

In order to clean the rollers without removing them from the skates, they are held in contact with the wheels $b$ $b$ while the latter are rotated, so that the skate-rollers are rapidly rotated and their faces cleaned by the shearing action of the edges of the grooves that are formed in the wheels $b$ $b$. At the same time the high side of the rollers (if there is one) is cut down. The sides of the rollers may be cleaned by holding a piece of rag or cotton waste in contact with them as they revolve.

The reamer or drill held in the chuck $c$ is used for reaming out the rollers and the hangers or brackets when they become worn, so that a bushing may be inserted, and the roller and hangers thus made as good as new.

In case the rollers are worn oval or irregular by reason of their having knots or hard spots in them, or should they become rounded, they are placed upon the chuck $d$ and turned true. In this manner a pair of roller-skates can be made to last much longer, and there is consequently a great saving of expense.

Having thus described my invention, I claim as new and desire to secure by Letters Patent—

1. In a machine for cleaning roller-skates, the rotary shaft $a$, provided with a pair of wheels, $b$ $b$, having a space between them equal to the distance between the pair of skate-wheels to be operated upon, the said wheels $b$ $b$ being provided with inclined grooves, whereby the rollers of a skate may be cleaned and evened without being removed therefrom, substantially as set forth.

2. A machine for cleaning roller-skates, the same consisting, essentially, in the frame A, the rotary shaft $a$, mounted thereon, and provided at its opposite ends with chucks adapted to receive a skate-roller or abrading-disk and a drill, respectively, rollers $b$ $b$, spaced and grooved, as described, and the rest $e$ adjacent to the roller-chuck, substantially as set forth.

RUFUS F. HULL.

Witnesses:
G. W. BOTHWELL,
M. A. HAVEN.